No. 848,497. PATENTED MAR. 26, 1907.
W. S. RUSE.
CORN HUSKING MACHINE.
APPLICATION FILED SEPT. 21, 1906.
3 SHEETS—SHEET 1.
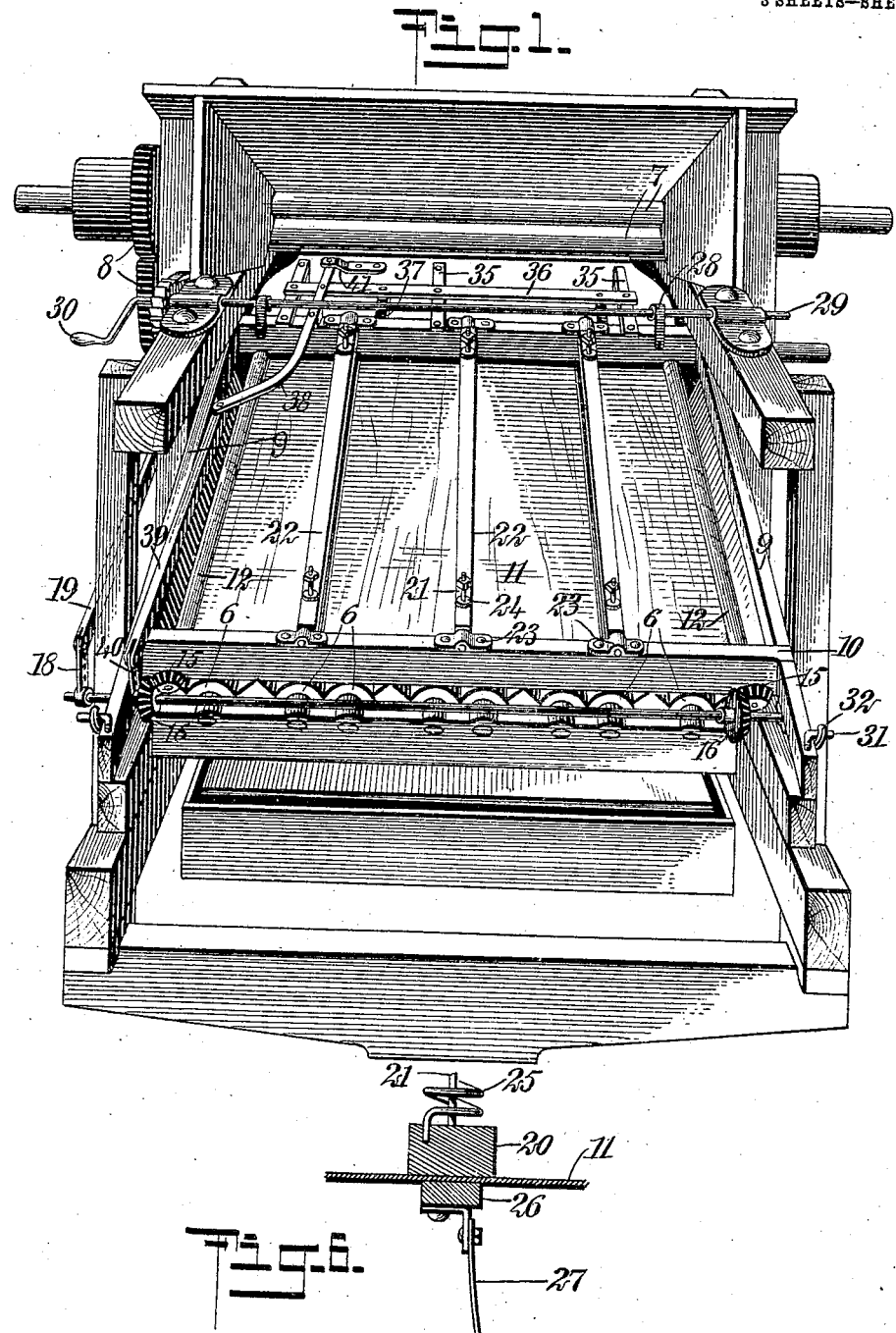
WITNESSES
INVENTOR
William S. Ruse
BY
ATTORNEYS

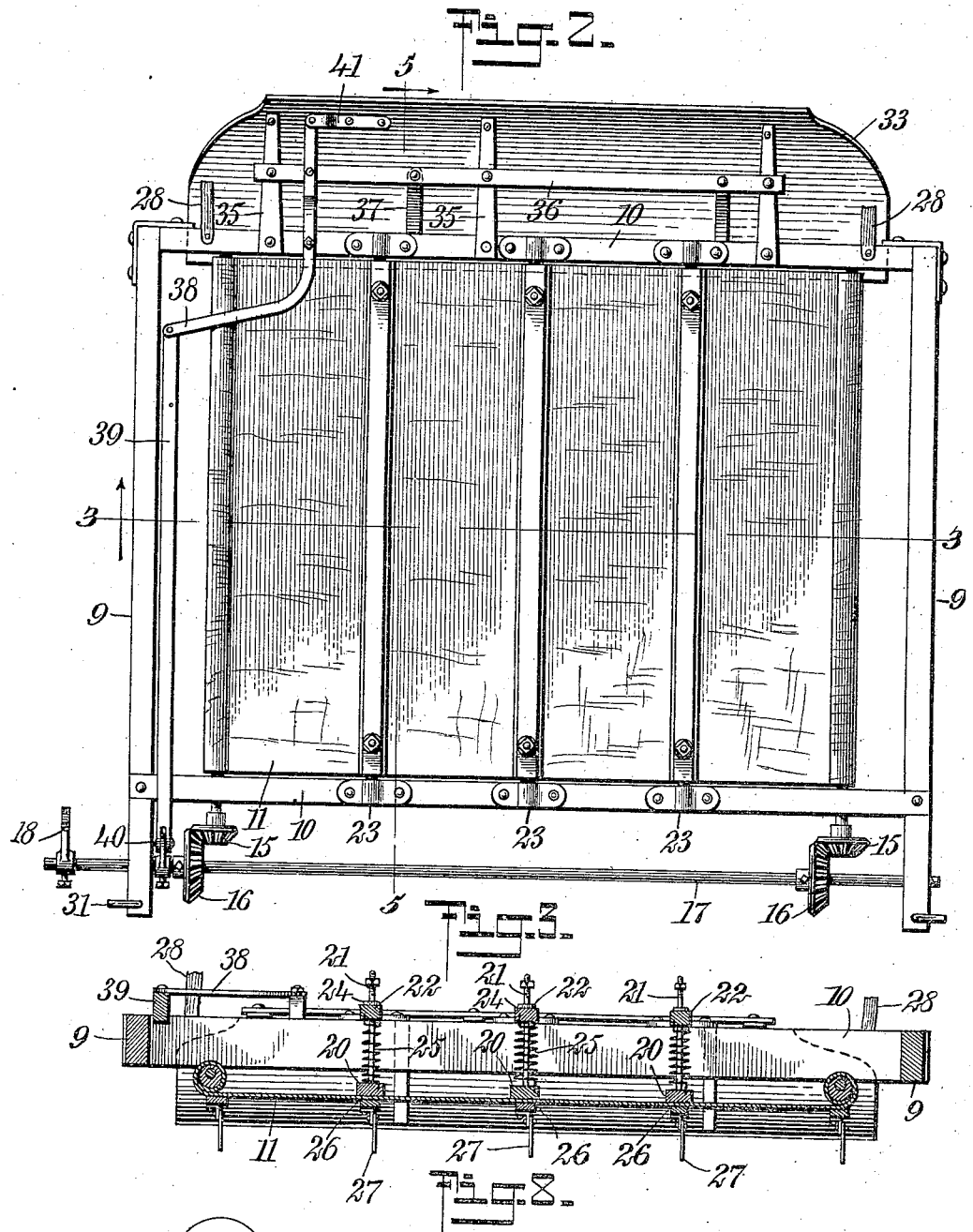

No. 848,497.     PATENTED MAR. 26, 1907.
W. S. RUSE.
CORN HUSKING MACHINE.
APPLICATION FILED SEPT. 21, 1906.
3 SHEETS—SHEET 3.
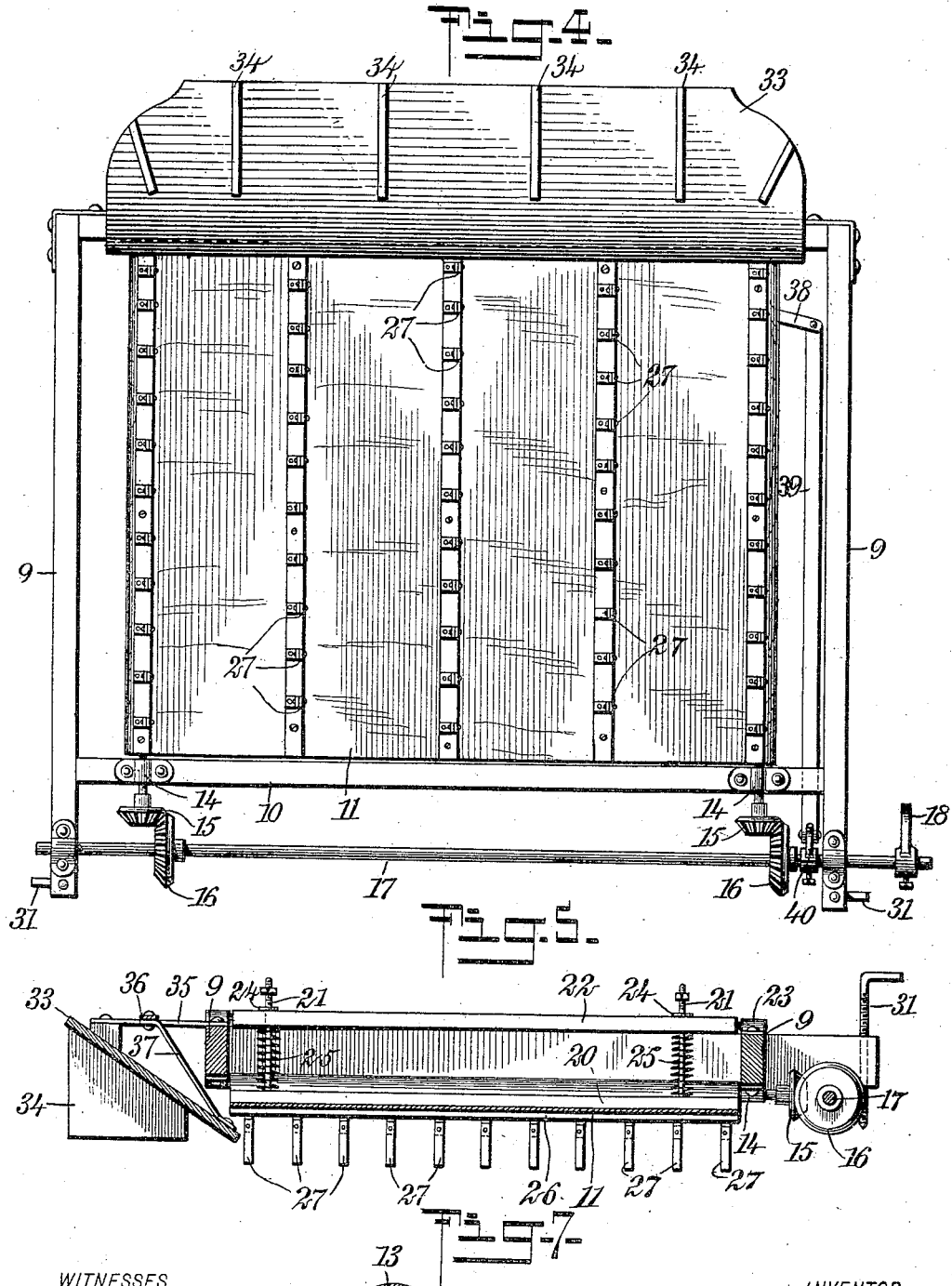
WITNESSES
H. G. Dieterich
C. W. Fairbank
INVENTOR
William S. Ruse
BY 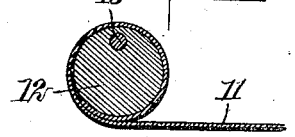
ATTORNEYS

UNITED STATES PATENT OFFICE.

WILLIAM S. RUSE, OF TWIN BLUFFS, WISCONSIN.

CORN-HUSKING MACHINE.

No. 848,497. Specification of Letters Patent. Patented March 26, 1907.

Application filed September 21, 1906. Serial No. 335,588.

*To all whom it may concern:*

Be it known that I, WILLIAM S. RUSE, a citizen of the United States, and a resident of Twin Bluffs, in the county of Richland and State of Wisconsin, have invented a new and Improved Corn-Husking Machine, of which the following is a full, clear, and exact description.

This invention relates to certain improvements in corn-husking machines, and, more in detail, involves an attachment for said machines whereby the machine is prevented from clogging up and all danger of injury to the operator is obviated.

Reference is to be had to the accompanying drawings, forming a part of this specification, in which similar characters of reference indicate corresponding parts in all the figures, in which—

Figure 1 is a perspective view of a corn-husking machine having my improved attachment secured thereto. Fig. 2 is a plan view of said attachment. Fig. 3 is a vertical section on the line 3 3 of Fig. 2. Fig. 4 is an inverted plan view. Fig. 5 is a vertical section on the line 5 5 of Fig. 2. Fig. 6 is a detail showing the manner of holding the corn against the husking-rollers. Fig. 7 is a detail showing the means of attaching the canvas to one of the rollers, and Fig. 8 is a detail showing the means employed for oscillating the rollers carrying the canvas.

In order to fully illustrate my improvement and the working thereof, I have shown in Fig. 1 a perspective view of a common form of corn-husking machine having husking-rollers 6, snapping-rollers 7, and gearing 8 for operating the machine.

My improved attachment comprises a rectangular frame made up of side members 9 and cross members 10, supporting at one end my improved shaking mechanism, while within and below the frame is supported my improved mechanism for preventing clogging of the husking-rollers. This latter mechanism comprises a sheet of canvas 11, extending entirely across the husking-rollers 6 and of a length substantially equal to the side rollers. This canvas has its opposite ends attached to rollers 12, which latter are secured to the frame by eccentrically-located pins 13, carried in journal-boxes 14 on the lower side of the frame at its opposite ends. For facilitating these rollers 12 and the canvas carried thereby I provide each of the pins 13 with bevel gear-wheels 15, adapted to mesh with gear-wheels 16, located on a shaft 17, journaled in extensions on the side 9 of the frame. The shaft 17 carries an arm connected by a pitman 19 to any suitable source of power, whereby the arm 18 may be oscillated, and the rollers 12, which carry the canvas, may thus be rotated back and forth through approximately three-fourths of a revolution. For varying the amount of rotation of the rollers I preferably provide the arm 18 with a plurality of holes, to which the pitman 19 may be attached, so that the relative rotation of the rollers 12 as compared with the throw of the pitman 19 may be varied at will. As the rollers 12 are eccentrically mounted and are adapted to rotate simultaneously, it will be noted that the canvas 11 will be moved not only back and forth longitudinally, but will at the same time be raised and lowered at an amount depending upon the eccentricity of the rollers 12. This canvas, as previously stated, is mounted directly above the main husking-rollers, and in order to hold it against the corn at all times I secure a plurality of strips 20, extending longitudinally of the canvas on its upper side and securely fastened to the canvas.

Each of these strips 20 is carried by two bolts 21, extending upwardly to corresponding strips 22, mounted to oscillate in journal-boxes 23 on the upper side of the frame. These bolts 21 preferably extend through the strips 22 and are provided on their upper sides with adjustable nuts 24, and intermediate of the strips 20 and 22 they are provided with coil-springs 25, so that the distance between the two strips may be reduced by upward pressure upon the canvas; but the distance between the strips cannot exceed a maximum determined by the location of the nuts 24. As the rollers 12 rotate upon their eccentrically-located pins 13 the canvas is raised from the husking-rollers, and as the strips 20 are secured to the canvas they move in the arc of a circle, with the strips 22 as centers, so that all the points of the canvas are simultaneously raised and lowered and no sagging of the canvas at the central portion is permitted.

On the under side of the canvas and directly below each of the strips 20 and at points adjacent the ends are located strips 26, carrying a plurality of springs 27, adapted to engage with the upper side of the ears of corn and hold them in contact with the husking-rollers, as clearly indicated in Fig. 6.

As these springs are carried by the canvas they move back and forth across the rollers and serve to prevent the husks from clogging up and interfering with the operation of the machine.

The main frame of my attachment may be adjusted to varying distances from the husking-rollers in any suitable manner, but preferably by means of straps 28, secured to the frame at one end and suspended from rollers on a shaft 29, mounted on the main frame of the husking-machine. By rotating this shaft 29 by means of a handle 30 the straps may be wound upon the shaft and this end of the frame raised and lowered at will. The other end of the frame is provided with screw-bolts 31, passing through the extensions of the frame and contacting with the main frame of the husking-machine. The frame of the attachment may be raised or lowered either by the contact of the lower ends of these bolts with the main frame or by the contact of the upper ends of the bolts with hooks 32, carried by the main frame.

For facilitating the fitting of the corn to the husking-rollers I provide a shaker comprising a board 33, having one end thereof extending beneath the canvas, as shown in Fig. 5, and having the lower side thereof provided with a plurality of baffles or partition-plates 34, serving to guide each ear of corn endwise onto the rollers. This board 33 may be reciprocated back and forth, so that the baffles 34 tend to bring each and all of the ears of corn into a longitudinal position relative to the rollers. For mounting and reciprocating this board I provide a plurality of arms 35, having one end of each pivoted to the cross member 10 of the frame and having the other end pivotally connected to the board. All of these arms are connected by a bar 36, to which may be secured braces 37, extending to the lower end of the board to support the latter.

Mounted on one of the cross members 10 of the frame is a bell-crank lever 38, having one end thereof secured to a reciprocating bar 39, which latter has its opposite end pivotally connected to an arm 40 on the shaft 17. The opposite end of the bell-crank lever 38 is pivoted to a bracket 41 and also to the connecting-bar 36. The amount of throw may be varied by varying the point of attachment of the reciprocating bar 39 to the arm 40.

In the operation of my improved attachment the sheet of canvas is moved back and forth across the husking-rollers and is simultaneously raised and lowered, whereby the springs 27, contacting with the ears of corn and the husks, prevent the rollers from becoming clogged up and also serve to agitate the material being operated upon and hold the ears in firm contact with the husking-rollers. The shaker 33 operates simultaneously with the canvas, and as it serves to direct the ears and stalks into the machine in a longitudinal direction it also serves to prevent the device from becoming clogged and its normal operation interfered with.

Having thus described my invention, I claim as new and desire to secure by Letters Patent—

1. In combination with the rolls of a corn-husking machine, a sheet of flexible fabric supported above said rolls, and means for moving said fabric back and forth across said rolls.

2. In combination with the rolls of a corn-husking machine, a fabric supported above said rolls, and means for moving said flexible fabric back and forth across said rolls and simultaneously varying the distance between said fabric and rolls.

3. A corn-husking machine having in combination husking-rolls, a fabric supported above said rolls, having the ends thereof attached to rollers eccentrically mounted, whereby as the fabric-supporting rollers are rotated the fabric is moved across said husking-rolls and simultaneously raised therefrom.

4. In combination with the rolls of a corn-husking-machine, a flexible fabric supported above said rolls, and means secured to said fabric at a plurality of points for simultaneously moving said fabric across the rolls and varying its distance therefrom.

5. In combination with the rolls of a corn-husking-machine, a fabric supported adjacent thereto, means for moving said fabric back and forth across said rolls, a plurality of springs carried by said fabric and adapted to press the material operated upon against said rolls, and means for moving said fabric.

6. A corn-husking machine having in combination husking-rollers, a fabric supported above said rolls, the ends of said fabric being attached to rollers eccentrically mounted, means attached to the upper side of said fabric and pivoted to the machine, and a plurality of springs carried by the under side of said fabric, whereby as the eccentrically-mounted rollers are rotated the springs are moved across the rolls and the distance between said springs and said rolls simultaneously varied.

7. In combination with a corn-husking machine, a rectangular frame carried thereon, means for adjusting the position of said frame in relation to said machine, a fabric carried within said frame, springs carried by the under side of said fabric, means for moving said fabric across said frame, means for guiding the material to be operated upon beneath said fabric, and means for moving said guiding means simultaneously with the movement of the fabric.

8. A corn-husking machine having in combination a plurality of husking-rolls, a fabric supported upon said rolls, means for continuously moving said fabric back and forth across said rolls and simultaneously varying the distance between said fabric and the said rolls, said means including two eccentrically-mounted rollers secured to the ends of said fabric, a plurality of rods secured to the upper surface of said fabric and pivotally mounted at their opposite ends, and coiled springs surrounding said rods for forcing the fabric into engagement with the rolls.

9. A corn-husking machine having in combination a plurality of husking-rolls, a fabric supported upon said rolls, the ends of said fabric being attached to rollers eccentrically mounted, a plurality of strips secured to the outer surface of said fabric, a plurality of bolts secured to each of said strips, means for pivotally and slidably supporting the outer ends of each of said bolts, coiled springs surrounding each of said bolts and pressing said fabric into engagement with said rolls, and a plurality of springs carried by the under side of said fabric and adapted to press the material operated upon into engagement with the husking-rolls.

In testimony whereof I have signed my name to this specification in the presence of two subscribing witnesses.

WILLIAM S. RUSE.

Witnesses:
DANIEL FLAMME,
JOHN H. FLAMME.